US012447738B2

(12) United States Patent
Röhl et al.

(10) Patent No.: US 12,447,738 B2
(45) Date of Patent: Oct. 21, 2025

(54) DEVICE AND METHOD FOR CLEANING EXHAUST AIR

(71) Applicant: Canon Production Printing Holding B.V., Venlo (NL)

(72) Inventors: Stefan Röhl, Munich (DE); Andreas Geishauser, Munich (DE); Revdin Dedic, Markt Schwaben (DE); Fabien Ferron, Munich (DE)

(73) Assignee: Canon Production Printing Holding B.V., Venlo (NL)

( * ) Notice: Subject to any disclaimer, the term of this patent is extended or adjusted under 35 U.S.C. 154(b) by 0 days.

(21) Appl. No.: 18/235,408

(22) Filed: Aug. 18, 2023

(65) Prior Publication Data

US 2024/0059058 A1 Feb. 22, 2024

(30) Foreign Application Priority Data

Aug. 19, 2022 (DE) ..................... 10 2022 120 972.5

(51) Int. Cl.
*B41F 23/04* (2006.01)
*F28D 21/00* (2006.01)

(52) U.S. Cl.
CPC ...... *B41F 23/0426* (2013.01); *F28D 21/0003* (2013.01); *F28D 2021/0019* (2013.01)

(58) Field of Classification Search
CPC ............. B41F 23/0426; F28D 21/0003; F28D 2021/0019; B01D 5/0051
See application file for complete search history.

(56) References Cited

U.S. PATENT DOCUMENTS

| | | | | |
|---|---|---|---|---|
| 2,907,119 A * | 10/1959 | Sylvena | .............. | B41F 23/0426 34/655 |
| 5,737,674 A | 4/1998 | Venkatesan et al. | | |
| 2019/0017431 A1 | 1/2019 | Hilakari et al. | | |

FOREIGN PATENT DOCUMENTS

| | | | | |
|---|---|---|---|---|
| DE | 69620218 T2 | 8/2002 | | |
| DE | 102011104924 A1 * | 1/2012 | .......... | B41F 23/0426 |
| DE | 102010062144 A1 | 5/2012 | | |
| DE | 102010062145 B4 * | 10/2015 | .......... | B41F 23/0426 |
| EP | 2600077 B1 | 11/2015 | | |
| WO | 2012143292 A1 | 10/2012 | | |
| WO | WO-2016184462 A1 * | 11/2016 | ........... | D06F 31/005 |

OTHER PUBLICATIONS

Office Action issued in DE102022120972.5 on Feb. 27, 2023.

* cited by examiner

*Primary Examiner* — Christopher E Mahoney
*Assistant Examiner* — Marissa Ferguson-Samreth
(74) *Attorney, Agent, or Firm* — The Webb Law Firm

(57) ABSTRACT

Provided is a device for cleaning exhaust air from a printing device by means of a heat exchanger. The device is configured to operate the heat exchanger in a standard phase such that an output temperature of the exhaust air exhibits a standard value such that hydrocarbons are condensed out of the exhaust air. The device is also configured to operate the heat exchanger in a regeneration phase such that the output temperature of the exhaust air exhibits a value. The value is reduced relative to the standard value, such that water is condensed out of the exhaust air.

13 Claims, 5 Drawing Sheets

DEVICE AND METHOD FOR CLEANING EXHAUST AIR

CROSS-REFERENCE TO RELATED APPLICATION

This application claims priority to German Patent Application No. 10 2022 120 972.5 filed Aug. 19, 2022, the disclosure of which is hereby incorporated by reference in its entirety.

BACKGROUND OF THE INVENTION

Field of the Invention

The invention relates to a device and a corresponding method for cleaning the exhaust air from a drying unit for drying a recording medium printed to in an inkjet printing device.

Description of Related Art

Inkjet printing devices may be used for printing to recording media, for example paper. For this purpose, one or more nozzles are used in order to fire ink droplets onto the recording medium, and thus to generate a desired print image on the recording medium.

An inkjet printing device can comprise one or more drying units in order to dry the recording medium after application of the print image and thereby fix the applied ink on the recording medium. A drying unit can have a drying route with a plurality of drying modules. The individual drying modules can be configured to blow a warmed gaseous drying medium, in particular air, toward the surface of the recording medium in order to dry said recording medium. The drying modules can thereby be arranged along the drying route such that the recording medium does not come into contact with the drying modules and floats through the drying unit.

In addition to water, other substances, in particular solvent and/or hydrocarbons, are also extracted from a recording medium within the scope of the drying of said recording medium, which substances are conveyed out of the drying unit together with the exhaust air. The exhaust air may be cleaned in a cleaning unit in order to reduce the amount of solvent. The exhaust air cleaning can thereby be effected via condensation of volatile hydrocarbons by means of a heat exchanger.

SUMMARY OF THE INVENTION

A fouling of the exhaust air cleaning unit, in particular of the heat exchanger, can occur during the operation of a printing device. The present document deals with the technical object of enabling an efficient and reliable cleaning of the exhaust air cleaning unit, in particular of the heat exchanger, of a printing device. The object is respectively achieved as discussed hereinafter.

According to one aspect, a device is described for cleaning exhaust air from a printing device by means of a heat exchanger. The device is configured to operate the heat exchanger in a standard phase such that the output temperature of the exhaust air at the output of the heat exchanger exhibits a standard value, in order to have the effect that hydrocarbons are condensed out of the exhaust air. The device is also configured to operate the heat exchanger in a regeneration phase such that the output temperature of the exhaust air exhibits a reduced value relative to the standard value, in order to have the effect that water—in particular additional water—is condensed out of the exhaust air.

According to a further aspect, a device is described for cleaning exhaust air from a printing device by means of a heat exchanger. The device is configured to operate the heat exchanger in a standard phase such that the output temperature of the exhaust air at the output of the heat exchanger exhibits a standard value, in order to have the effect that hydrocarbons are condensed out of the exhaust air. The device is also configured to operate the heat exchanger in a regeneration phase such that a cleaning fluid is introduced into the heat exchanger and/or into exhaust air that flows at the heat exchanger, such that condensate generated in the heat exchanger is liquefied and/or diluted by the cleaning fluid.

According to a further aspect, a heat exchanger, a drying unit, and/or a printing device are described that comprise at least one of the devices described in this document.

According to a further aspect, a method is described for cleaning exhaust air from a printing device by means of a heat exchanger. The method comprises the operation of the heat exchanger in a standard phase such that the output temperature of the exhaust air at the output of the heat exchanger exhibits a standard value, via which it is effected that hydrocarbons are condensed out of the exhaust air. The method also comprises the operation of the heat exchanger in a regeneration phase such that the output temperature of the exhaust air exhibits a reduced value relative to the standard value, via which it is effected that water is condensed out of the exhaust air.

According to a further aspect, a method is described for cleaning exhaust air from a printing device by means of a heat exchanger. The method comprises the operation of the heat exchanger in a standard phase such that the output temperature of the exhaust air at the output of the heat exchanger exhibits a standard value, via which it is effected that hydrocarbons are condensed out of the exhaust air. The method also comprises effecting, during a regeneration phase, that a cleaning fluid—water in particular—is introduced into the heat exchanger and/or into exhaust air that flows at the heat exchanger, such that condensate generated in the heat exchanger is liquefied and/or diluted by the cleaning fluid.

BRIEF DESCRIPTION OF THE DRAWINGS

The terms Fig., Figs., Figure, and Figures are used interchangeably in the specification to refer to the corresponding figures in the drawings.

In the following, exemplary embodiments of the invention are described in detail using the schematic drawings. Thereby shown are.

DESCRIPTION OF THE INVENTION

Figure 1A:
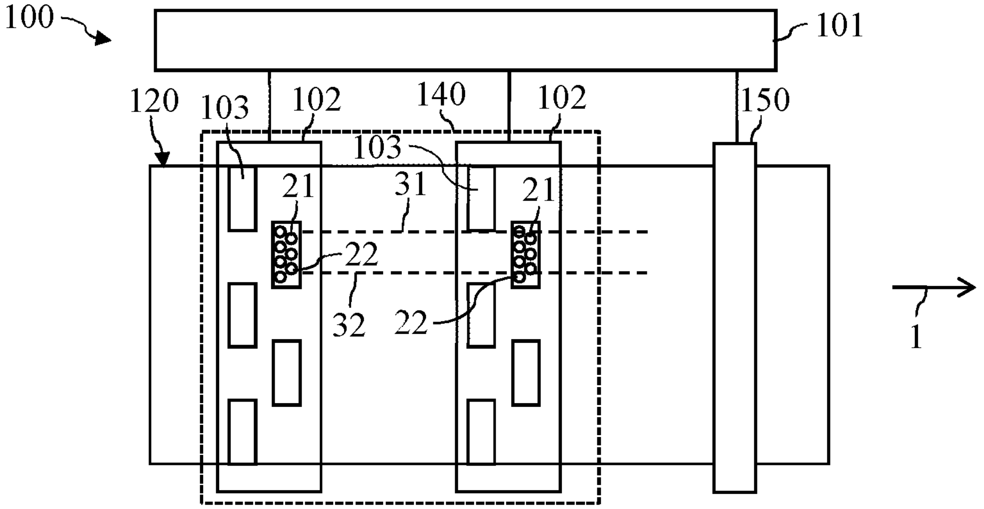
FIG. 1*a* a block diagram of an example of an inkjet printing device having a drying or fixing unit.

The printing device 100 depicted in FIG. 1*a* is designed for printing to a recording medium 120 in the form of a sheet or page or plate or belt. The recording medium 120 can be produced from paper, paperboard, cardboard, metal, plastic, textiles, a combination thereof, and/or other materials that are suitable and can be printed to. The recording medium 120 is guided along the transport direction 1, represented by an arrow, through the print group 140 of the printing device 100.

In the depicted example, the print group 140 of the printing device 100 comprises two print bars 102, wherein each print bar 102 can be used for printing with ink of a defined color, for example black, cyan, magenta, and/or yellow, and MICR ink if applicable. Different print bars 102 can be used for printing with respective different inks. Furthermore, the printing device 100 comprises at least one fixing or drying unit 150 that is configured to fix a print image printed onto the recording medium 120.

A print bar 102 can comprise one or more print heads 103 that, if applicable, are arranged in a plurality of rows side-by-side in order to print the dots of different columns 31, 32 of a print image onto the recording medium 120. In the example depicted in FIG. 1*a*, a print bar 102 comprises five print heads 103, wherein each print head 103 prints the dots of a group of columns 31, 32 of a print image onto the recording medium 120.

In the embodiment illustrated in FIG. 1*a*, each print head 103 comprises a plurality of nozzles 21, 22, wherein each nozzle 21, 22 is configured to fire or eject ink droplets onto the recording medium 120. For example, a print head 103 of the print group 140 can comprise multiple thousands of effectively utilized nozzles 21, 22 that are arranged along a plurality of rows transverse to the transport direction 1 of the recording medium 120. Dots of a line of a print image can be printed onto the recording medium 12 transverse to the transport direction 1, i.e. along the width of the recording medium 120, by means of the nozzles 21, 22 of a print head 103 of the print group 140.

The printing device 100 also comprises a control unit or control device 101, for example an activation hardware and/or a controller, that is configured to drive actuators of the individual nozzles 21, 22 of the individual print heads 103 of the print group 140 in order to apply the print image onto the recording medium 120 depending on print data.

The print group 140 of the printing device 100 thus comprises at least one print bar 102 having K nozzles 21, 22 that can be activated with a defined line timing in order to print a line, said line traveling transverse to the transport direction 1 of the recording medium 120, with K pixels or K columns 31, 32 of a print image onto the recording medium 120, for example with K>1000. In the depicted example, the nozzles 21, 22 are installed so as to be immobile or fixed in the printing device 100, and the recording medium 120 is directed past the stationary nozzles 21, 22 with a defined transport velocity.

As presented above, the printing device 100 can comprise a drying unit 150 that is configured to dry the recording medium 120 after application of the ink by the one or more print bars 102, and therewith to fix the applied print image onto the recording medium 120. For this purpose, the drying unit 150 can be controlled by the control unit 101 of the printing device 100. For example, the drying can take place depending on the quantity of the applied ink and/or depending on the type of the recording medium 120. For example, the temperature and/or the volumetric flow of the gaseous drying medium can be adapted depending on the quantity of the applied ink and/or depending on the type of the recording medium 120.

Figure 1B:
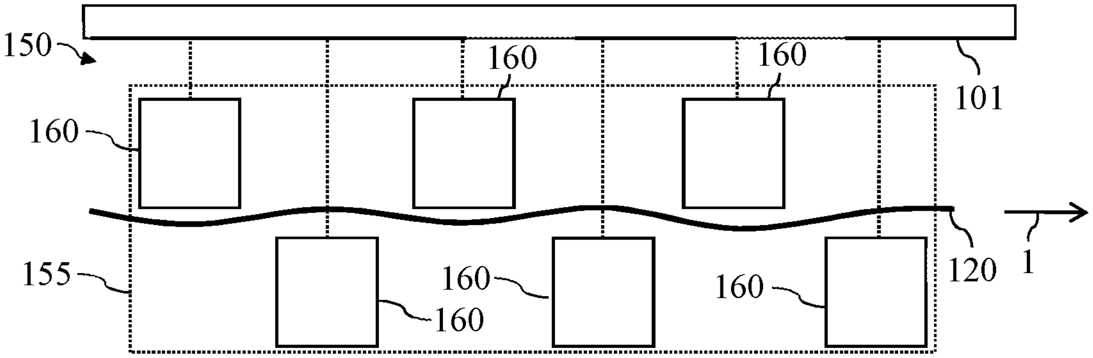
FIG. 1*b* a block diagram of an example of a drying unit for an inkjet printing device.

The drying unit 150 depicted in FIG. 1*b* comprises a plurality of drying modules 160 that are arranged along a drying route on both sides of a (typically belt-shaped) recording medium 120 and that are respectively configured to blow a gaseous drying medium, typically warmed air, onto the surface of the recording medium 120. The drying route with the drying modules 160 is thereby arranged in a housing 155 of the drying unit 150. Via the blowing with a gaseous drying medium, the print image can be dried gently and reliably along the drying route of the drying unit 150.

Figure 1C:
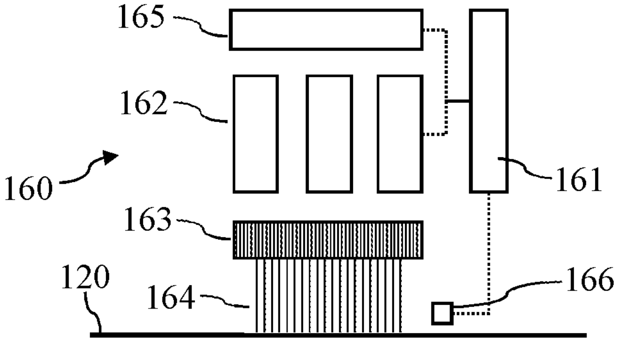
FIG. 1*c* a block diagram of an example of a drying module for a drying unit.

FIG. 1*c* shows a block diagram with examples of components of a drying module 160. The drying module 160 depicted in FIG. 1*c* comprises a blower 165 with which a gaseous medium, in particular air, can be directed past one or more heating elements 162. The drying medium 164 warmed by the heating elements 162 is blown via one or more openings or nozzles 163 onto the surface of the recording medium 120. The delivery rate of the blower 165 and/or the heating capacity of the one or more heating elements 162 can be controlled or regulated via a control module 161 of the drying module 160, wherein the control module 161 can, if applicable, be part of the control unit 101 of the drying unit 160 or of the printing device 100. In particular, the temperature in the environment of the recording medium 120 can be detected by means of a temperature sensor 166. The control module 161 can be configured to control or regulate the blower 165 and/or the one or more heating elements 162 depending on sensor data of the temperature sensor 166. For example, a defined temperature in the environment of the recording medium 120 can thus be set.

A contactless float drying by means of a forced convection can thus be used to dry a recording medium 120. As depicted in FIG. 1*b*, for this purpose the individual drying modules 160 are arranged alternately on the front side and back side of the recording medium 120 along the drying route. The recording medium 120 can then be pushed or pulled through the drying unit 150, past the drying modules 160, while floating.

During the drying, water vapor and solvent vapors escape from the recording medium 120. A gas mixture of water vapor and solvent vapor thus appears in the housing 155 of the drying unit 150. The gas mixture can be conveyed out of the housing 155 with a ventilator in order to avoid a flammable gas mixture forming inside the housing 155, and in order to remove the moisture from the housing 155 of the drying unit 150. In this document, the gas mixture is also referred to as exhaust gas and/or as exhaust air.

Figure 2A:
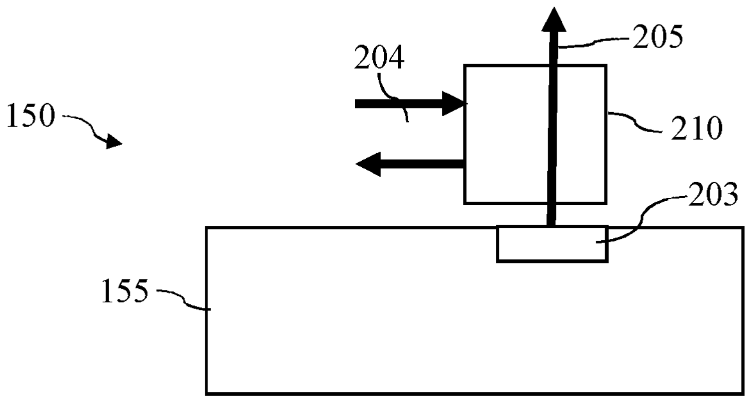
FIG. 2*a* an example of a drying unit having a heat exchanger for cleaning exhaust air from the drying unit.

FIG. 2*a* shows a drying unit 150 with a heat exchanger 210 that is configured to clean the exhaust air 205 removed from the housing 155 of the drying unit 150. The exhaust air

205 can be removed from the housing 155 of the drying unit 150 by means of a ventilator 203. The exhaust air 205 cleaned by the heat exchanger 210 can be discharged into the environment. In the heat exchanger 210, thermal energy can be transferred from the exhaust air 205 to a cooling fluid 204, for example to air or to water.

An exhaust air cleaning via condensation of volatile hydrocarbons in the exhaust air 205 of a printing device 100 can thus be implemented by means of an air-water heat exchanger 210. In operation, deposits can occur on the air-side components of the exhaust air cleaning, for example on the fins of the heat exchanger register, in the floor pan of the heat exchanger housing, and/or in the condensate drain lines. Examples of deposits are paper dust from the paper drying, and/or substances that evaporate from the recording medium 120 within the scope of the drying, and/or ink, which are introduced into the exhaust air cleaning with the exhaust air 205 to be cleaned. The deposited substances can be dust-like substances and/or substances that solidify due to the cooling of the exhaust air 205.

The thermal transfer between the exhaust air 205 and the heat exchanger 210 is reduced by deposits on the components—in particular the air-side components—of the heat exchanger 210, whereby the process of the exhaust air cleaning is disrupted. Moreover, blockages may be created in the condensate outflow region of the heat exchanger 210, such that the condensate can drain anywhere in the printer in an uncontrolled manner.

Given fouling, the components of the exhaust air cleaning can be cleaned by maintenance personnel with the aid of a cleaning agent (water, for example). The maintenance activity that is connected with this is lined with a relatively high time and personnel cost, and leads to an unwanted interruption of operation of the printing device 100.

In this document, measures are described that enable an automatic regeneration cleaning of the exhaust air cleaning components, in particular of the heat exchanger 210, during the operation of the printing device 100. The deliberate condensing of water out of the exhaust air 205 can be effected as a measure of the regeneration cleaning, wherein the one or more exhaust air cleaning components can be flushed out of the exhaust air 205 via the water that has condensed out. The condensing out of water can be effected via supercooling of the exhaust air 205 below the dew point of the water contained in the exhaust air 205. As an alternative or additional measure for regeneration cleaning, a cleaning medium, in particular a cleaning fluid, for example water, can be introduced into the exhaust air 205 and/or into the fouled region of the heat exchanger 210.

Via an automated regeneration cleaning occurring during running printing operation, the functionality of the exhaust air cleaning can be ensured without complicated maintenance tasks needing to be performed. The temperature profile of the heat exchanger 210 can also be adapted in an optimized manner to the requirements of the exhaust air cleaning in order to reduce the quantity of VOCs (Volatile Organic Compounds), i.e. the quantity of hydrocarbons, according to the respective requirements, without the consistency of the condensate thereby needing to be considered, since a sufficiently high fluidity of the condensate can be effected via the repeated, in particular cyclical, increase in the quantity of fluid in the heat exchanger 210. Furthermore, the operation of the exhaust air cleaning can be focused on the efficient condensing out of VOCs, without the continuous fluidity of the generated condensate needing to be considered.

Figure 2B:
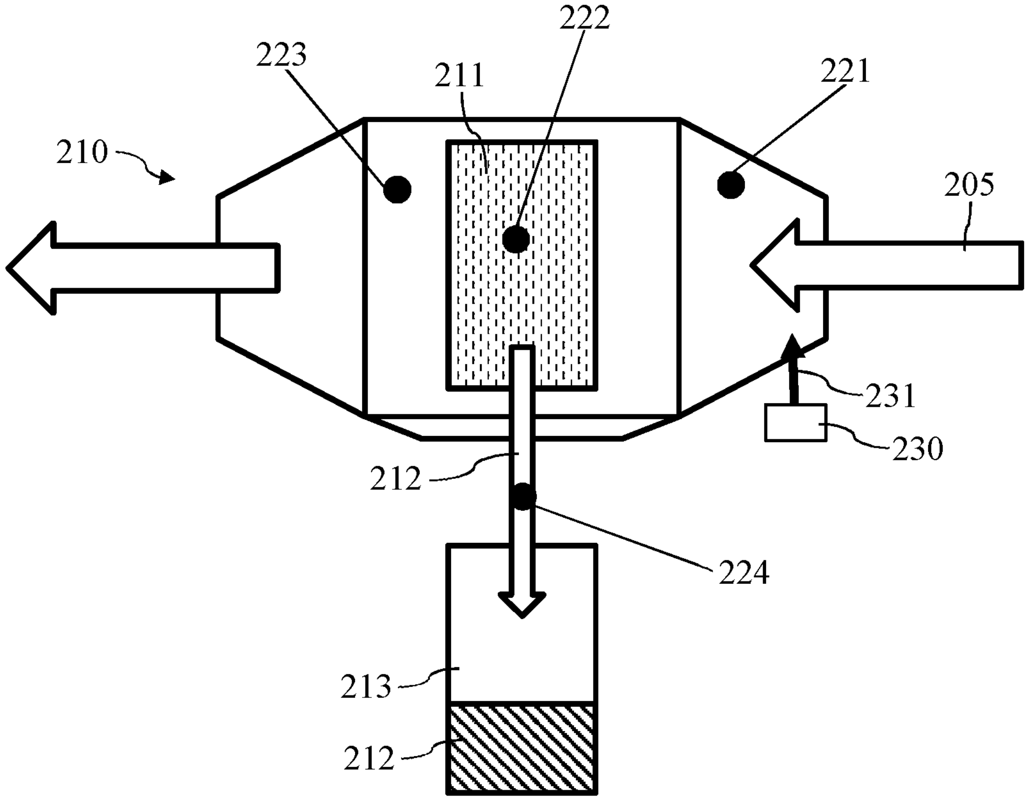
FIG. 2*b* an example of a heat exchanger having a capture container for condensate.

FIG. 2*b* shows an example of a heat exchanger 210 that is designed to clean exhaust air 205 supplied to the heat exchanger 210. The exhaust air 205 has a higher input temperature 221 at the input of the heat exchanger 210. The exhaust air 205 is directed past a heat exchanger surface 211 at which the transfer of thermal energy to the cooling fluid 204 is effected. The heat exchanger surface 211 can exhibit a surface temperature 222. The surface temperature 222 can be adjusted and/or adapted due to the temperature and/or due to the volumetric flow of the cooling fluid 204. By adjusting the surface temperature 222, the quantity of thermal energy that is removed from the exhaust air 205 can be adjusted, and/or the lower output temperature 223 of the exhaust air 205 at the output of the heat exchanger 210 can be set.

Via the general lowering of the temperature of the exhaust air 205 from the input temperature 221 to the output temperature 223, it can be effected that VOCs, i.e. hydrocarbons, condense on the heat exchanger surface 211, and thus the exhaust air 205 can be cleaned. The condensate 212 appearing in the heat exchanger 210 can be conducted via a drain line into a capture container 213. The quantity 224 of condensate 212 thereby typically depends on the output temperature 223 of the exhaust air 205. The heat exchanger 210 can be configured to vary the output temperature 223 of the exhaust air 205, for example by changing the temperature and/or the volumetric flow of the cooling fluid 204, for example in order to increase the water fraction in the condensate 212 as needed, and in order to thereby achieve a higher fluid quantity. This increased fluid quantity has the effect of a regeneration cleaning of the heat exchanger 210.

Alternatively or additionally, the heat exchanger 210 can comprise an injection unit 230, for instance a pump and/or an injection nozzle, that is configured to introduce a cleaning fluid 230, in particular a cleaning liquid, into the exhaust air flow, for example at the input of the heat exchanger 210. The quantity of fluid in the heat exchanger 210 can thus be increased as needed in order to effect a regeneration cleaning of the heat exchanger 210.

For the temporary supercooling of the exhaust air 205, the cooling power of the heat exchanger 210 can be increased in a regeneration phase, for instance via a control and/or regulation, in order to fall below the dew point of the water contained in the exhaust air 205. An injection unit 230 can be used for the introduction of a cleaning fluid 231. The dedicated introduction of a cleaning fluid 231 has the advantage that the quantity of fluid that is made available for the regeneration cleaning of the heat exchanger 210 can be set independently of the printing process and of the ink quantity that is applied therein. A regeneration cleaning of the heat exchanger 210 via an introduced cleaning fluid 231 can, if applicable, be implemented in a dedicated process step, even if no recording medium 20 is printed to, such that the temperature of the heat exchanger register, of the heat exchanger housing, of the exhaust air 205, and/or of the cleaning fluid 231 can be specifically adjusted for a regeneration cleaning of the heat exchanger 210 that is as optimized as possible.

In the housing of the heat exchanger 210, the exhaust air 205 of the printing device 100 that is charged with VOCs thus flows with a defined input temperature 221, in particular when a recording medium is printed to. In the heat exchanger 210 with the surface temperature 222, the exhaust air 204 is supercooled to the output temperature 223. All substances for which the supercooling of the exhaust air 205 falls below their respective dew point thereby condense out on the surface 211 of the heat exchanger 210, for example on fins or on a tube bundle, and flow as condensate 212 into a capture container 213.

The goal of the exhaust air cleaning is typically to condense out as many VOCs as possible, and thereby as little water as possible, from the exhaust air 205 in the printing operation, in order to limit the quantity 224 of condensate 212 that must be processed. FIG. 3*b* shows examples of correlations 301, 302 between the concentration and/or quantity 300 remaining in the exhaust air 205 at the exit of the heat exchanger 210 and the output temperature 223 of the exhaust air 205, for water (correlation 302) and for VOCs (correlation 301). Given a standard value 310 of the output temperature 223, a situation may be present in which essentially only VOCs are condensed out, such that a defined concentration and/or quantity 320 of VOCs remain in the exhaust air 205. By reducing the output temperature 223 to the reduced value 311 and by falling below the dew point of water, on the one hand the concentration and/or quantity 321 of VOCs remaining in the exhaust air 205 is reduced, which means that an increased quantity of VOCs can be condensed out. Additional water condensate also accumulates in the heat exchanger 210, such that the concentration and/or quantity 331 of water in the exhaust air 205 is reduced. The quantity of water that is condensed out is thereby typically significantly greater than the quantity of VOCs that is condensed out. The quantity of water that is condensed out depends on one or more boundary conditions such as, for example, printing conditions and/or room humidity.

Figure 3A:
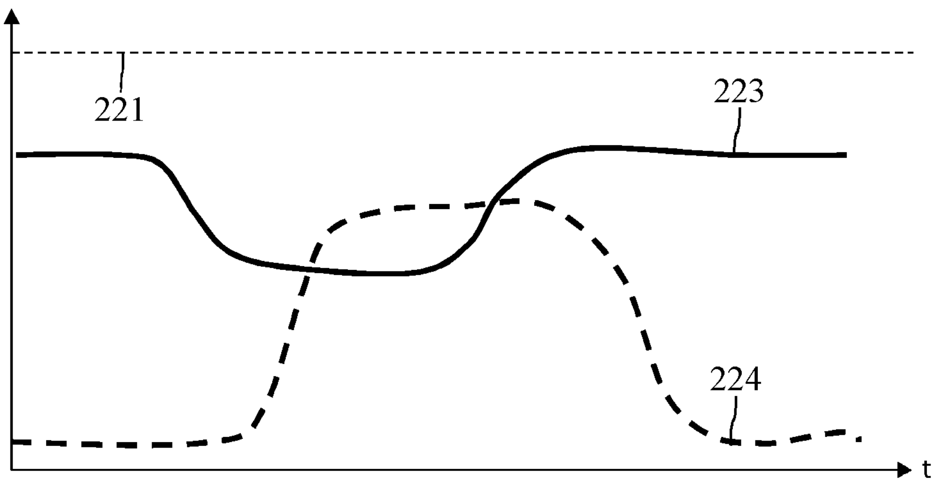
FIG. 3*a* examples of time curves of the output temperature of the exhaust air and the quantity of condensate that is generated in the heat exchanger.
Figure 3B:
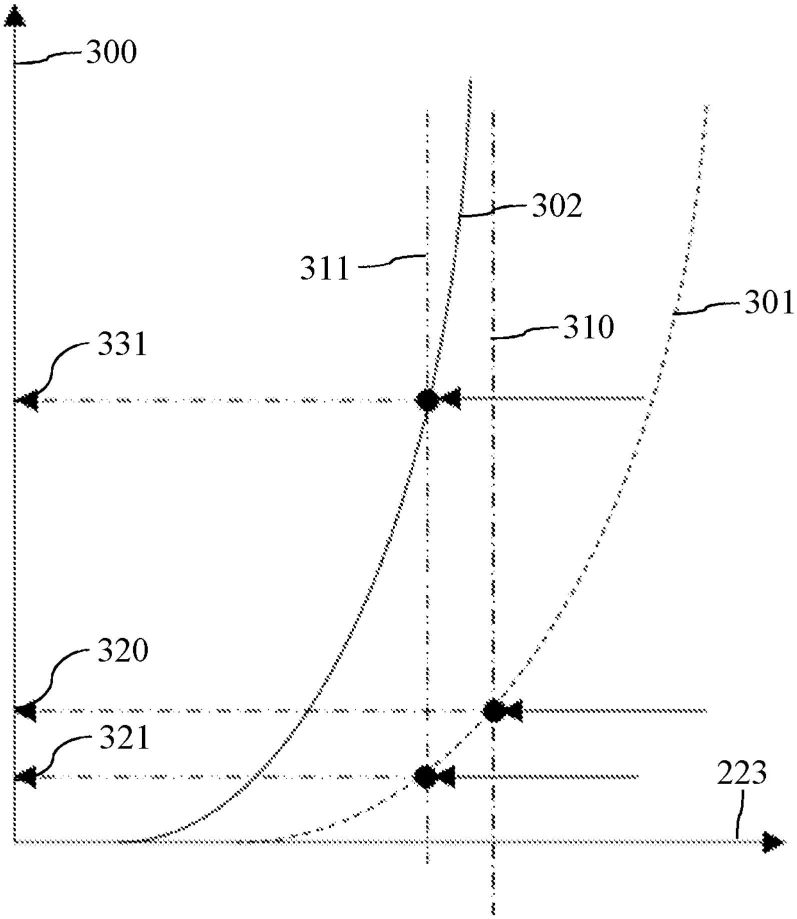
FIG. 3*b* examples of correlations between the condensate quantity and the output temperature of the exhaust air.

By lowering the output temperature 223 of the exhaust air 205 from the standard value 310 to the reduced value 311, the quantity 224 of the condensate 212 can thus be increased, as is presented by way of example in FIG. 3*a*. An efficient and reliable regeneration cleaning of the heat exchanger 210 can be effected by increasing the condensate quantity 224, in particular by increasing the quantity of water in the condensate 212, since most material contaminants in the heat exchanger are washed out much better due to the increase in the condensate quantity 224. The input temperature 221 of the exhaust air 205 can be assumed to be largely constant in the printing operation. Given a decrease in the output temperature 223, the outflow quantity 224 of condensate 212 increases with a time offset. In a regeneration process, the condensate 212 becomes more fluid, whereby contaminants at the heat exchanger 210, at the floor of the heat exchanger housing, and in the outflow are mobilized. Given a subsequent resetting of the output temperature 223 to the standard value 310, the condensate quantity 224 decreases again with a time offset.

Figure 4:
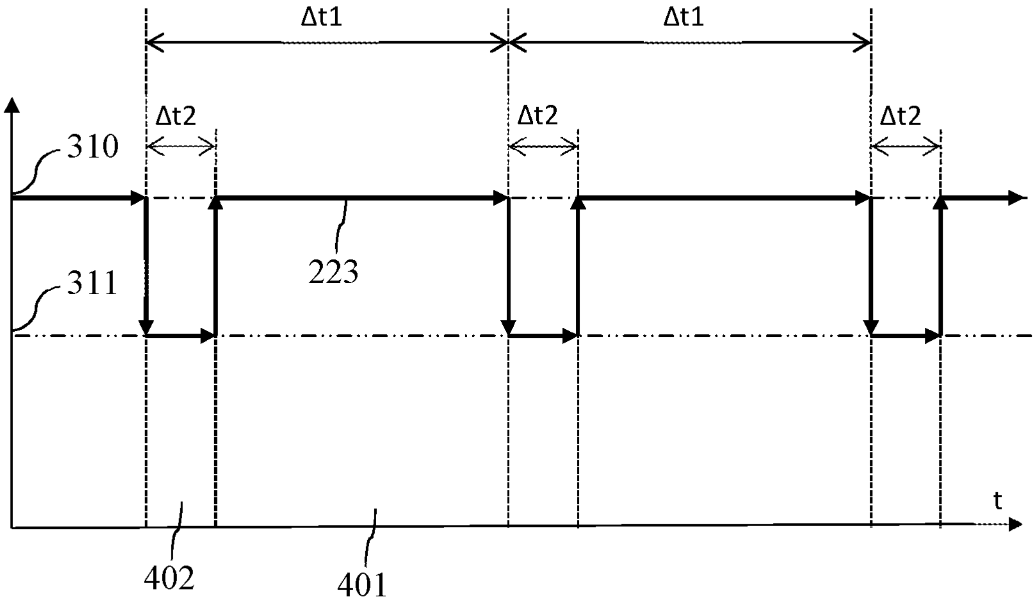
FIG. 4 an example of a time curve of the output temperature of the exhaust air during the operation of a drying unit.

FIG. 4 shows an example of a time curve of the output temperature 223 of the exhaust air 205. In a standard phase 401 of the operation of the heat exchanger 210, the output temperature 223 can thereby exhibit the standard value 310. The output temperature 223 can also be reduced to the decreased and/or reduced value 311 in a regeneration phase 402 of the operation of the heat exchanger 210 in order to effect a regeneration cleaning of the heat exchanger 210. The regeneration phase 402 can have a duration Δt2, and the standard phase 401 can have a duration Δt1-Δt2. In the depicted example, a regeneration phase 402 is periodically inserted (respectively after expiration of the duration Δt1). A regeneration phase 402, in which the output temperature 223 of the exhaust air 205 is decreased to the reduced value 311 in order to implement a regeneration cleaning of the heat exchanger 210, can thus be statically inserted repeatedly, in particular periodically.

Alternatively, the duration Δt2 and/or the frequency of the regeneration phases 402 can be adapted dynamically, for example depending on the quantity 224 of condensate 212 accumulating in the printing operation.

Figure 5A:
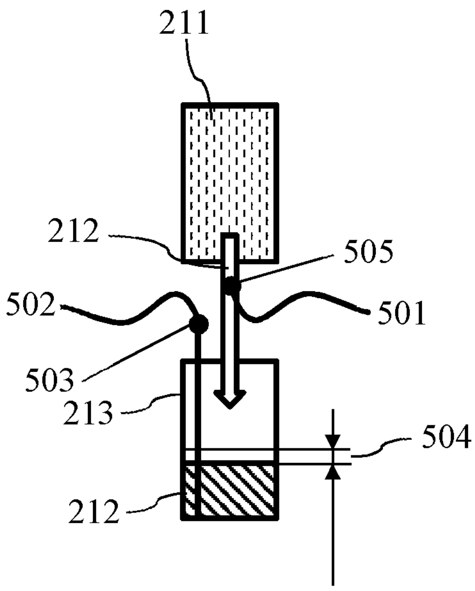
FIG. 5*a* an example of a measurement of the condensate quantity generated in the heat exchanger.

FIG. 5*a* shows an example of a measuring unit 502 that is configured to detect measured values 503 with regard to the fill level of the capture container 213. A measuring unit 501 (for example a volumetric flow rate sensor) can also be used that is configured to detect measured values 505 with regard to the condensate quantity 224 flowing through the condensate drain line.

Figure 5B:
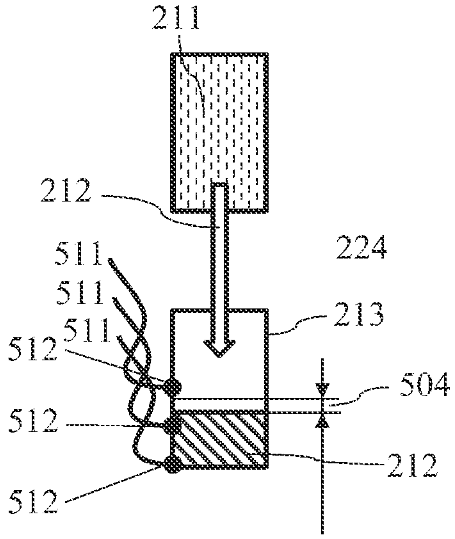
FIG. 5*b* an example of a measurement of the condensate quantity generated in the heat exchanger.

FIG. 5*b* shows a capture container 213 that comprises a respective digital switch 511 at different fill level heights, wherein a digital switch 511 is respectively configured to provide a measured value 512 that indicates whether the fill level of condensate 212 is higher or lower than the respective fill level height.

The quantity of condensate 212 per time unit can be determined on the basis of the measured values 503, 505, 512. In particular, a check can be made as to whether a defined minimum outflow volume of condensate 212 was created in the interval Δt1. If this is so, the temporary decrease in the output temperature 223, i.e. the implementation of a regeneration phase 402, can thus be omitted in order to avoid the accumulating quantity of condensate being unnecessarily increased.

If a volumetric flow rate is no longer measurable within the interval Δt1, the temperature decrease can be activated in order to initiate a regeneration phase 402. The temperature decrease can be deactivated, for example after expiration of the duration Δt2, in order to end the regeneration phase 402. Alternatively or additionally, the temperature decrease can be deactivated as soon as a defined outflow volume 504 is achieved.

Figure 6A:
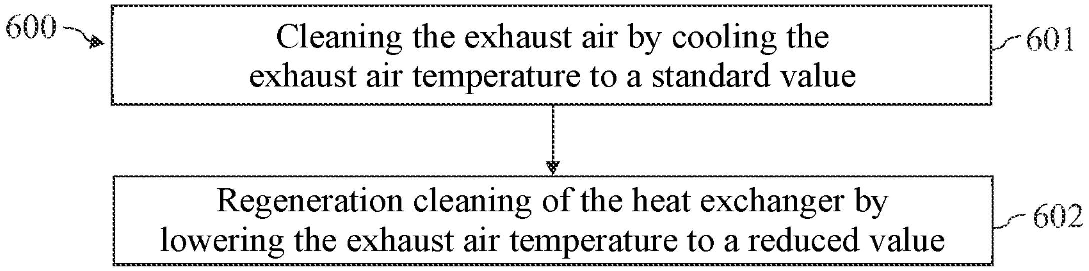
FIG. 6*a* a workflow diagram of an example of a method for exhaust air cleaning.

FIG. 6*a* shows a workflow diagram of a method (if applicable, a computer-implemented method) 600 for cleaning exhaust air 205 from a printing device 100, in particular from an inkjet printing device, by means of a heat exchanger 210. The exhaust air 205 can comprise water vapor and/or hydrocarbons, in particular VOCs. The method 600 is designed to reduce the quantity and/or the concentration of hydrocarbons in the exhaust air 205 (for example corresponding to statutory provisions with regard to maximum permissible concentration quantities).

The method 600 comprises the operation 601 of the heat exchanger 201 in a standard phase 401 such that the output temperature 223 of the exhaust air 205 at the output of the heat exchanger 210 exhibits a standard value 310 via which it is effected that hydrocarbons are condensed out of the exhaust air 205. The operation of the heat exchanger 210 in the standard phase 401 can thereupon be focused and/or optimized to reduce the quantity and/or the concentration of hydrocarbons in the exhaust air 205. The heat exchanger 210 is preferably to be operated for more than 50%, in particular for more than 80% or for more than 90%, of the operating time in the standard phase 401.

The method 600 also comprises the operation 602 of the heat exchanger 210 in a regeneration phase 402 such that the output temperature 223 of the exhaust air 205 exhibits a reduced value 311 relative to the standard value 310, via which it is effected that water is condensed out of the exhaust air 205. The operation of the heat exchanger 210 in the regeneration phase 402 can thereupon be focused and/or optimized to effect a regeneration cleaning of the heat exchanger 210. The heat exchanger 210 is preferably operated for less than 50%, in particular for less than 20% or for less than 10%, of the operating time in the regeneration phase 402.

Via the insertion of one or more regeneration phases 402 into the standard operation, i.e. between one or more standard phases 401, of the heat exchanger 210, an efficient and reliable regeneration cleaning of the heat exchanger 210 can be enabled, in particular without thereby needing to interrupt the printing operation of the printing device 100.

By decreasing the output temperature 223 from the standard value 310 to the reduced value 311, the quantity of hydrocarbons in the condensate 212 is typically also increased in addition to the quantity of water in the condensate 212. The standard value 310 of the output temperature 223 can be established such that, at the standard value 310, the exhaust air 205 at the output of the heat exchanger 210 exhibits a target concentration of hydrocarbons, for example 50 $g/m^3$, at least averaged over time. In other words, in a standard phase 401 it can be effected that the exhaust air 205 at the output of the heat exchanger 210 exhibits a target concentration of hydrocarbons. On the other hand, in a standard phase 401 an optimally low quantity 224 of condensate 212 is generated in order to keep the expenditure for post-processing of the condensate 212 low.

In a regeneration phase 402, the quantity 224 of condensate 212 can be increased, in a time-limited manner, by reducing the output temperature 223 to the reduced value 311, in order to effect a reliable regeneration cleaning of the heat exchanger 210. The concentration of hydrocarbons in the exhaust air 205 at the output of the heat exchanger 210 is thereby typically also reduced to below the target concentration.

Figure 6B:
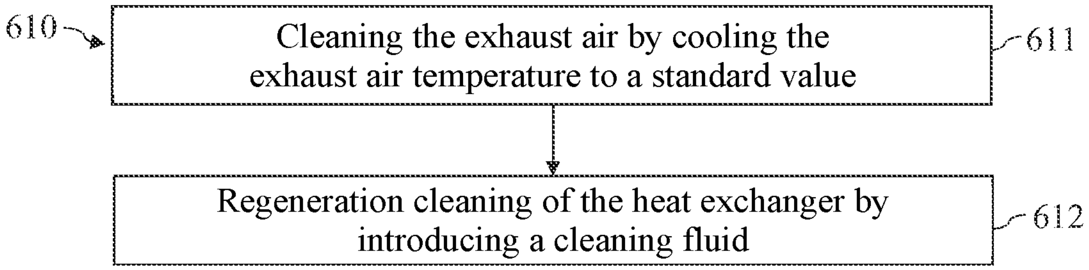
FIG. 6*b* a workflow diagram of a further example of a method for exhaust air cleaning.

FIG. 6*b* shows a workflow diagram of an additional (if applicable, computer-implemented) method 610 for cleaning exhaust air 205 from a printing device 100 by means of a heat exchanger 210. The aspects presented in conjunction with the method 500 are accordingly applicable to the method 610. The methods 600 and 610 can also be used in combination.

The method 610 comprises the operation 611 of the heat exchanger 210 in a standard phase 401 such that the output temperature 223 of the exhaust air 205 at the output of the heat exchanger 210 exhibits a standard value 310 via which it is effected that hydrocarbons are condensed out of the exhaust air 205.

Furthermore, the method 610 comprises effecting 612, during a regeneration phase 402, that a cleaning fluid 231 (in particular water) is introduced (in particular injected) into the heat exchanger 210 and/or into the exhaust air 205 that flows to the heat exchanger 210, such that condensate 212 generated in the heat exchanger 210 is liquefied and/or diluted by the cleaning fluid 231. Via the (possibly additional) injection of a cleaning fluid 231, an especially reliable regeneration cleaning of the heat exchanger 210 can be enabled, in particular independently of the printing operation of the printing device 100.

A device 101, for instance a control unit and/or a controller for a printing device 100 and/or for a drying unit 150 and/or for a heat exchanger 210, is thus described that is designed for cleaning exhaust air 205 from a printing device 100 by means of a heat exchanger 210. The device 101 can be part of the printing device 100 and/or of the drying unit 150 and/or of the heat exchanger 210.

The device 101 is configured to operate the heat exchanger 210 in a standard phase 401, for instance for a standard operation of the heat exchanger 210, such that the output temperature 223 of the exhaust air 205 at the output of the heat exchanger 210 exhibits a standard value 310, in order to effect that hydrocarbons are condensed out of the exhaust air 205. In the standard phase 401, a cleaning of the exhaust air 205 can thus be at least primarily effected.

The device 101 is also configured to operate the heat exchanger 210 in a regeneration phase 402 such that the output temperature 223 of the exhaust air 205 exhibits a value 311 that is reduced relative to the standard value 310, in order to have the effect that water is condensed out of the exhaust air 205. In addition to the exhaust air cleaning, a regeneration cleaning of the heat exchanger 210 can be effected in the regeneration phase 402.

The device 101 can be configured to operate the heat exchanger 210 alternately in a standard phase 401 and in a regeneration phase 402. Alternatively or additionally, the device 101 can be configured to repeatedly interrupt an operation of the heat exchanger 210 in the standard phase 401 with a regeneration phase 402. In particular, by default an operation in a standard phase 401 can take place that is interrupted by a regeneration phase 402 as needed in order to effect a regeneration cleaning of the heat exchanger 210. A lasting, reliable exhaust air cleaning can thus be efficiently enabled.

The heat exchanger 210 can be designed to transfer thermal energy from the exhaust air 205 to a cooling fluid 204 in order to lower the exhaust air temperature from the input temperature 221 at the input of the heat exchanger 210 to the output temperature 223, and in order to thereby generate a condensate 212 from the exhaust air 205 that comprises hydrocarbons, in particular VOCs.

The device 101 can be configured to reduce the temperature of the cooling fluid 204, and/or to increase the volumetric flow of the cooling fluid 204, in order to reduce the output temperature 223 of the exhaust air 205 from the standard value 310 to the reduced value 311. Generally expressed, the device 101 can be configured to increase the cooling capacity of the heat exchanger 210 in order to reduce the output temperature 223 of the exhaust air 205 at the output of the heat exchanger 210 from the standard value 310 to the reduced value 311.

Alternatively or additionally, the device 101 can be configured to increase the temperature of the cooling fluid 204, and/or to reduce the volumetric flow of the cooling fluid 204, in order to increase the output temperature 223 of the exhaust air 205 from the reduced value 311 to the standard value 310. Generally expressed, the device 101 can be configured to reduce the cooling capacity of the heat exchanger 210 in order to increase the output temperature 223 of the exhaust air 205 from the reduced value 311 to the standard value 310. An efficient and reliable switching between a standard phase 401 and a regeneration phase 402 can thus be effected.

The reduced value and/or the standard value of the output temperature of the exhaust air are preferably such that the fraction of water in the condensate 212 generated from the exhaust air 205 in the heat exchanger 210 is higher at the reduced value 311, in particular is higher by a factor of 5 or more, than at the standard value 310. Alternatively or additionally, the reduced value and/or the standard value of the output temperature of the exhaust air are preferably such that the quantity 224 of condensate 212 generated per time unit is greater at the reduced value 311, in particular is greater by a factor of 5 or more, than at the standard value 310. The reduced value 311 of the output temperature 223 can be below the dew point of water, and/or the standard value 310 of the output temperature 223 can be above the dew point of water. A particularly efficient and reliable exhaust air cleaning and regeneration cleaning can be effected via such a selection of the standard value 310 and/or of the reduced value 311.

In a static operation, the heat exchanger 210 can be periodically operated in a regeneration phase 402 with a defined repetition rate. The duration of the periodically repeated regeneration phases 402 can thereby be consistent. A particularly efficient and reliable exhaust air cleaning and regeneration cleaning are thus enabled.

On the other hand, the device can be configured to determine one or more measured values 503, 505, 512 with regard to the quantity 224 of condensate 212 that is generated from the exhaust air 205 in the heat exchanger 210, for example that is generated per time unit. Whether—starting from a regeneration phase 402—a transition from the regeneration phase 402 into a subsequent standard phase 401, or whether—starting from a standard phase 401—a transition from a standard phase 401 into a subsequent regeneration phase 402, is effected or not can then be determined depending on the one or more measured values 503, 512 in a flexible and customized manner. A dynamically adapted insertion of regeneration phases 401 can thus take place. The efficiency and the reliability of the exhaust air cleaning and regeneration cleaning can thus be further increased.

The device 101 can be configured to determine, while the heat exchanger 210 is being operated in a standard phase 401 and on the basis of the one or more measured values 503, 505, 512, whether a predefined minimum quantity of condensate 212 has been generated from the exhaust air 205 or not in a time interval Δt1. The transition from the standard phase 401 into the subsequent regeneration phase 402 can be effected if, possibly only when, the predefined minimum quantity of condensate 212 has not been generated from the exhaust air 205 in the time interval Δt1. Alternatively or additionally, the heat exchanger 210 can continue to be operated in the standard phase 401 if the predefined minimum quantity of condensate 212 has been generated from the exhaust air 205 in the time interval Δt1. A customized insertion of regeneration phases 402 can thus be reliably effected.

The device 101 can be configured to determine, while the heat exchanger 210 is being operated in a regeneration phase 402 and on the basis of the one or more measured values 503, 505, 512, whether or not a predefined target quantity 504 of condensate 212 has already been generated from the exhaust air 205 since the beginning of the regeneration phase 402. The transition from the regeneration phase 402 into the subsequent standard phase 401 can be effected if the predefined target quantity 504 of condensate 212 has already been generated, or as soon as it is generated, from the exhaust air 205. Alternatively or additionally, the heat exchanger 210 can continue to be operated in the regeneration phase 402 if the predefined target quantity 504 of condensate 212 has not yet been generated from the exhaust air 205. A particularly efficient and reliable regeneration cleaning of the heat exchanger 210 can thus be effected.

The device 101 can be configured to introduce a cleaning fluid 231, in particular water, into the heat exchanger 210 and/or into exhaust air 205 that flows to the heat exchanger 210, for example at the input of the heat exchanger 210, during the regeneration phase 402, such that condensate 212 generated in the heat exchanger 210 from the exhaust air 205 is liquefied and/or diluted by the cleaning fluid 231. The quality of the regeneration cleaning of the heat exchanger 210 can be further increased by the dedicated introduction of a cleaning fluid 231.

A further device 101 for cleaning exhaust air 205 from a printing device 100 by means of a heat exchanger 210 is described. The aspects described in this document are also applicable to this device 101 individually and/or in combination.

The device 101 is configured to operate the heat exchanger 210 in a standard phase 401 such that the output temperature 223 of the exhaust air 205 at the output of the heat exchanger 210 exhibits a standard value 310, in order to effect that hydrocarbons are condensed out of the exhaust air 205. The device 101 is also configured to effect, during a regeneration phase 402, that a cleaning fluid 231, in particular water, is introduced into the heat exchanger 210 and/or into exhaust air that flows to the heat exchanger 210, such that condensate 212 generated in the heat exchanger 210 is liquefied and/or diluted by the cleaning fluid 231. An exhaust air cleaning and a regeneration cleaning of the heat exchanger 210 can thus be efficiently and reliably effected.

REFERENCE LIST

1 transport direction
21, 22 nozzle (print image)
31, 32 column (of the print image)
100 printing device
101 control unit/control device
102 print bar
103 print head
120 recording medium
140 print group
150 fixing or drying unit
160 drying module
161 control module
162 heating element
163 nozzle
164 tempered drying medium (air)
165 blower
166 temperature sensor
203 ventilator
204 cooling fluid
205 exhaust air
210 heat exchanger
211 surface (heat exchanger)
212 condensate
213 capture container
221 input temperature (exhaust air)
222 surface temperature (heat exchanger)
223 output temperature (exhaust air)
224 condensate quantity
230 injection unit (cleaning fluid)
231 cleaning fluid
300 quantity/concentration of a substance in the exhaust air
301 correlation between quantity/concentration—output temperature (hydrocarbons)
302 correlation between quantity/concentration—output temperature (water)
310 standard value
311 decreased or reduced value
320, 321 quantity/concentration (hydrocarbons) in the exhaust air
331 quantity/concentration (water) in the exhaust air
401 standard phase
402 regeneration phase
501 measurement unit/volumetric flow rate sensor
502 measurement unit/fill state sensor
503 measured value (fill state)

504 target quantity
505 measured value (volumetric flow and/or mass flow)
511 measurement unit/switch
512 measured value (switch)
600 method for exhaust air cleaning
601-602 method steps
610 method for exhaust air cleaning
611-612 method steps

The invention claimed is:

1. A printing device, comprising:

at least one print group configured to print an image onto a recording medium;

a drying unit configured to fix the image onto the recording medium;

a heat exchanger, the heat exchanger configured to transfer thermal energy from the exhaust air to a cooling fluid; and a device configured to control a cleaning of exhaust air from the printing device by the heat exchanger, the device is operatively connected to at least one of the printing device, the drying unit, or the heat exchanger and comprising a controller configured to operate the heat exchanger in a standard phase such that an output temperature of the exhaust air at an output of the heat exchanger exhibits a standard value, via which hydrocarbons are condensed out of the exhaust air;

to operate the heat exchanger in a regeneration phase such that the output temperature of the exhaust air exhibits a value that is reduced relative to the standard value by at least one of reducing a temperature of the cooling fluid or increasing a volumetric flow of the cooling fluid, via water is condensed out of the exhaust air, wherein the reduced value and/or the standard value of the output temperature of the exhaust air are such that: a fraction of water in a condensate generated from the exhaust air in the heat exchanger is greater at the reduced value than at the standard value; and/or a quantity of condensate that is generated per time unit is greater at the reduced value than at the standard value; and/or the reduced value of the output temperature is below a dew point of water, and the standard value of the output temperature is above a dew point of water;

to determine one or more measured values with regard to the quantity of condensate that is generated from the exhaust air in the heat exchanger; and to determine, depending on the one or more measured values, whether a transition—starting from a regeneration phase—from the regeneration phase into a subsequent standard phase, or a transition—starting from a standard phase—from the standard phase into a subsequent regeneration phase, is effected.

2. The printing device according to claim 1, wherein the controller is further configured to operate the heat exchanger alternately in the standard phase and in the regeneration phase; and/or to repeatedly interrupt an operation of the heat exchanger in the standard phase with the regeneration phase; and/or to operate the heat exchanger in the regeneration phase periodically, with a defined repetition rate.

3. The printing device according to claim 1, wherein the controller is further configured, while the heat exchanger is being operated in the standard phase, to determine, on a basis of the one or more measured values, whether a predefined minimum quantity of condensate has been generated from the exhaust air in a time interval (Δt1); and to effect the transition from the standard phase into the subsequent regeneration phase if the predefined minimum quantity of condensate has not been generated from the exhaust air in the time interval (Δt1); and/or to continue to operate the heat exchanger in the standard phase if the predefined minimum quantity of condensate has been generated from the exhaust air in the time interval (Δt1).

4. The printing device according to claim 1, wherein the controller is further configured, while the heat exchanger is being operated in a regeneration phase, to determine, on a basis of the one or more measured values, whether a predefined target quantity of condensate has already been generated from the exhaust air since the beginning of the regeneration phase; and to effect the transition from the regeneration phase into the subsequent standard phase if the predefined target quantity of condensate has already been generated from the exhaust air; and/or to continue to operate the heat exchanger in the regeneration phase if the predefined target quantity of condensate has not yet been generated from the exhaust air.

5. The printing device according to claim 1, wherein the controller is further configured to increase the temperature of the cooling fluid, and/or to reduce the volumetric flow of the cooling fluid, in order to increase the output temperature of the exhaust air from the reduced value to the standard value.

6. The printing device according to claim 1, wherein the controller is further configured to introduce, during the regeneration phase, a cleaning fluid into the heat exchanger and/or into the exhaust air flowing to the heat exchanger, so that condensate generated from the exhaust air in the heat exchanger is diluted by the cleaning fluid.

7. A method for cleaning exhaust air from a printing device with a heat exchanger, the heat exchanger configured to transfer thermal energy from the exhaust air to a cooling fluid, the method comprising:

operating the heat exchanger in a standard phase such that an output temperature of the exhaust air at an output of the heat exchanger exhibits a standard value, via which hydrocarbons are condensed out of the exhaust air; and operating the heat exchanger in a regeneration phase such that the output temperature of the exhaust air exhibits a value that is reduced relative to the standard value by at least one of reducing a temperature of the cooling fluid or increasing a volumetric flow of the cooling fluid, via water is condensed out of the exhaust air, wherein the reduced value and/or the standard value of the output temperature of the exhaust air are such that: a fraction of water in a condensate generated from the exhaust air in the heat exchanger is greater at the reduced value than at the standard value; and/or a quantity of condensate that is generated per time unit is greater at the reduced value than at the standard value; and/or the reduced value of the output temperature is below a dew point of water, and the standard value of the output temperature is above a dew point of water;

determining one or more measured values with regard to the quantity of condensate that is generated from the exhaust air in the heat exchanger; and determining, depending on the one or more measured values, whether a transition—starting from a regeneration phase—from the regeneration phase into a subsequent standard phase, or a transition—starting from a standard phase—from the standard phase into a subsequent regeneration phase, is effected.

8. The method according to claim 7, further comprising:

operating the heat exchanger alternately in the standard phase and in the regeneration phase; and/or repeatedly interrupting an operation of the heat exchanger in the standard phase with the regeneration phase; and/or operating the heat exchanger in the regeneration phase periodically, with a defined repetition rate.

9. The method according to claim 7, further comprising, while the heat exchanger is being operated in the standard phase, determining, on a basis of the one or more measured values, whether a predefined minimum quantity of condensate has been generated from the exhaust air in a time interval (Δt1); and effecting the transition from the standard phase into the subsequent regeneration phase if the predefined minimum quantity of condensate has not been generated from the exhaust air in the time interval (Δt1); and/or continuing to operate the heat exchanger in the standard phase if the predefined minimum quantity of condensate has been generated from the exhaust air in the time interval (Δt1).

10. The method according to claim 7, further comprising, while the heat exchanger is being operated in a regeneration phase, determining, on a basis of the one or more measured values, whether a predefined target quantity of condensate has already been generated from the exhaust air since the beginning of the regeneration phase; and effecting the transition from the regeneration phase into the subsequent standard phase if the predefined target quantity of condensate has already been generated from the exhaust air; and/or continuing to operate the heat exchanger in the regeneration phase if the predefined target quantity of condensate has not yet been generated from the exhaust air.

11. The method according to claim 7, further comprising increasing the temperature of the cooling fluid, and/or reducing the volumetric flow of the cooling fluid, in order to increase the output temperature of the exhaust air from the reduced value to the standard value.

12. The method according to claim 7, further comprising introducing, during the regeneration phase, a cleaning fluid, into the heat exchanger and/or into the exhaust air flowing to the heat exchanger, so that condensate generated from the exhaust air in the heat exchanger is diluted by the cleaning fluid.

13. The method according to claim 7, wherein the cleaning fluid is water.

* * * * *